(12) United States Patent
Ayela et al.

(10) Patent No.: US 11,104,578 B2
(45) Date of Patent: Aug. 31, 2021

(54) METHOD FOR EXFOLIATING PARTICLES

(71) Applicant: UNIVERSITÉ GRENOBLE ALPES, Saint-Martin-d'Heres (FR)

(72) Inventors: Frédéric Ayela, Chambery (FR); Damien Colombet, Saint-Martin-d'Heres (FR)

(73) Assignee: UNIVERSITE GRENOBLE ALPES, Saint-Martin-d'Heres (FR)

( * ) Notice: Subject to any disclaimer, the term of this patent is extended or adjusted under 35 U.S.C. 154(b) by 337 days.

(21) Appl. No.: 16/302,468

(22) PCT Filed: May 16, 2017

(86) PCT No.: PCT/EP2017/061726
§ 371 (c)(1),
(2) Date: Nov. 16, 2018

(87) PCT Pub. No.: WO2017/198665
PCT Pub. Date: Nov. 23, 2017

(65) Prior Publication Data
US 2019/0276316 A1    Sep. 12, 2019

(30) Foreign Application Priority Data
May 18, 2016  (FR) ...................................... 1654418

(51) Int. Cl.
*C01B 32/19*    (2017.01)
*C01B 32/225*    (2017.01)
(Continued)

(52) U.S. Cl.
CPC .............. *C01B 32/19* (2017.08); *B01J 19/008* (2013.01); *B01J 19/1812* (2013.01);
(Continued)

(58) Field of Classification Search
CPC ....... C01B 32/19; C01B 32/23; C01B 32/225; C01B 2204/26; C01B 32/182;
(Continued)

(56) References Cited

U.S. PATENT DOCUMENTS

| 2002/0054995 A1 | 5/2002 | Mazurkiewicz |
| 2015/0239741 A1 | 8/2015 | Burton et al. |
| 2017/0166449 A1* | 6/2017 | Yoo .......................... C01B 32/19 |

FOREIGN PATENT DOCUMENTS

| CN | 102249222 A | 11/2011 | |
| WO | 2015099457 A1 | 7/2015 | |
| WO | WO 2015/099457 | * 7/2015 | ............. C01B 31/04 |

OTHER PUBLICATIONS

Panagiotou, et al., Deagglomeration and Dispersion of Carbon Nanotubes Using Microfluidizer® High Shear Fluid Processors, NSTI-Nanotech 2008; 1: 39-42 (Year: 2008).*
(Continued)

*Primary Examiner* — Daniel C. McCracken
(74) *Attorney, Agent, or Firm* — Hauptman Ham, LLP (57) ABSTRACT

The invention relates to an exfoliation method according to which a fluid loaded with particles flows at a first flow rate into a first (2), and then into a second, section of a pipe (1), the first flow rate being suitable for generating shear stresses and cavitation bubbles in the fluid as it passes through the first section (2) of the pipe (1), the second section (3) having a hydraulic diameter suitable for bringing about an implosion of cavitation bubbles as soon as the fluid exits the first section (2) and flows into the second section (3), so that an exfoliation of the particles is brought about under the combined action of the shear stresses and a shock wave generated by the implosion of the cavitation bubbles, the first section (2) having a hydraulic diameter less than 300 µm.

17 Claims, 4 Drawing Sheets

(51) Int. Cl.
    *B01J 19/00*        (2006.01)
    *B01J 19/18*        (2006.01)
    *C01B 32/23*        (2017.01)
(52) U.S. Cl.
    CPC ............ *C01B 32/225* (2017.08); *C01B 32/23* (2017.08); *C01B 2204/26* (2013.01)
(58) Field of Classification Search
    CPC ............ C01B 32/198; C01B 2204/04; C01B 2204/06; C01B 2204/065; C01B 2204/20; C01B 2204/22; C01B 2204/24; C01B 2204/28; C01B 2204/30; C01B 2204/32; C01B 32/20; C01B 32/205; C01B 32/21; C01B 32/215; C01B 32/22; C01B 2204/00; C01B 2204/02; B01J 19/008; B01J 19/1812
    See application file for complete search history.

(56) References Cited

OTHER PUBLICATIONS

Hydraulic Diameter, accessed online at: https://www.engineeringtoolbox.com/hydraulic-equivalent-diameter-d_458.html on Jan. 16, 2021 (Year: 2021).*
Wetted perimeter, accessed online at: https://en.wikipedia.org/wiki/Wetted_perimeter on Jan. 16, 2021 (Year: 2021).*
International Search Report from corresponding International Application No. PCT/EP2017/061726, dated Jul. 14, 2017, pp. 1-3, European Patent Office, Rijswijk, The Netherlands.

* cited by examiner

METHOD FOR EXFOLIATING PARTICLES

FIELD OF THE INVENTION

The invention relates to a method for exfoliating particles suspended in a fluid subjected to shear stresses and to cavitation.

TECHNOLOGICAL BACKGROUND

A method for exfoliating particles, such as graphite particles, known from the state of the art and describes in patent US 2015/0239741 comprises the insertion of a carrier fluid loaded with said particles in a cavitation reactor. The cavitation reactor is, for example, the device described in paragraph § [0058] and in FIGS. 3a and 3b of application US 2015/0239741.

According to this method known from the state of the art, as soon as the carrier fluid loaded with particles is inserted in the functioning cavitation reactor, cavitation bubbles are formed. The exfoliation of the particles is thus triggered by a shock wave generated by the implosion of said cavitation bubbles.

Thus, this method known from the state of the art, applied to graphite, makes it possible to form graphene particles having a thickness, for example of between 10 and 20 nm. The graphene particles are presented in the form of micro sheets comprising a reduced number of monoatomic planes of carbon graphite.

The thickness of said graphene particles is measured along a direction perpendicular to the monoatomic planes of carbon graphite.

Patent application CN 10224922 also proposes an exfoliation method by generating cavitation bubbles. The method, thus proposed, comprises the flow of a fluid loaded with particles, said flow being suitable for generating cavitation bubbles in said fluid loaded with particles, so that an exfoliation of particles is brought about under the action of a shock wave generated by the implosion of the particles.

However, the two methods relating to applications US 2015/0239741 and CN 102249222 are not satisfactory.

Indeed, the stresses brought about by the cavitation of the carrier fluid do not make it possible to achieve the effectiveness required for this type of method.

Moreover, the size distribution of the particles formed, by the exfoliation method according to the state of the art, is too high.

Furthermore, the methods known from the state of the art do not make it possible to adjust the size of the particles formed, and more specifically, do not make it possible to obtain large sizes (for example, size greater than 1 µm).

Finally, such methods known from the prior art often require large quantities of carrier fluid, thus excluding the use of toxic fluids.

An aim of the invention is to propose an exfoliation method having an improved effectiveness with respect to the methods known from the state of the art.

SUMMARY OF THE INVENTION

The aim of the invention is resolved by a method for exfoliating particles, the method comprising the flow, at a first flow rate, of a carrier fluid loaded with particles, in a first section, then in a second section of a pipe, the first section and the second section being contiguous, the first flow rate being suitable for generating shear stresses and cavitation bubbles in the carrier fluid loaded with particles as it passes through into the first section of the pipe, the second section of the pipe having a hydraulic diameter suitable for bringing about an implosion of cavitation bubbles as soon as the carrier fluid loaded with particles exits the first section and flows into the second section, so that an exfoliation of the particles is brought about under the combined action of shear stresses and a shock wave generated by the implosion of the cavitation bubbles, the first section of the pipe having a hydraulic diameter less than 300 µm, preferably less than 150 µm, also more preferably, less than 90 µm, and the first flow rate is suitable so that the flow of the carrier fluid loaded with particles into the first section is laminar. Thus, the method according to the invention makes it possible to achieve the exfoliation of particles suspended in a carrier fluid flowing in the pipe by imposing a pressure to the flow that is a lot lower than that which is known from the state of the art. Indeed, for a hydraulic diameter less than 300 µm, it can be considered to exert a pressure on the flowing carrier fluid of less than 20 bars, preferably less than 10 bars. More specifically, for a hydraulic diameter less than 150 µm, a pressure exerted on the carried fluid of between 6 and 8 bars is sufficient for implementing the method according to the invention.

Moreover, the first section, because of the low hydraulic diameter thereof, represents a confined volume, with respect to that which is known from the state of the art. This confinement thus imposes a greater number of cavitation bubbles, and of a smaller size with respect to the state of the art. Thus, the implosion of the cavitation bubbles creates, because of the small size of said bubbles, a shock wave of lesser intensity with respect to the state of the art. Consequently, said shock wave makes it possible to assist the exfoliation due to shearing, without breaking the exfoliated planes (graphene planes, for example). It is thus possible to obtain exfoliated particles of a larger size that those obtained by the methods known from the state of the art (by larger size, this means a greater extent along the exfoliation plane). The quality of the exfoliated particles is found to be improved. Consequently, an improvement of the effectiveness of the method can be observed. It can also be advantageous for the cross-section of the first section to have an elongated shape (by elongate shape, this means a long, slender shape). The elongated shape of the cross-section can be defined by the aspect ratio thereof. Thus, the cross-section can have an elongated shape with an aspect ratio greater than 3. According to such an aspect ratio, it is possible to obtain a confinement along one single dimension, and consequently, to produce a large number of first sections on one same device or on one same chip. Contrary to what a person skilled in the art would have been able to consider, the processing of a greater quantity of particles to be exfoliated does not necessarily go through increasing the volume of the pipe (sizing upwards).

By elongated shape, this means a shape extending along a direction. In other words, a first dimension of the shape is greater than a second dimension of said shape, the first dimension being perpendicular to the second dimension.

Furthermore, reducing the hydraulic diameter also makes it possible to increase the shear stresses being exerted on the particles to be exfoliated.

In addition, a laminar flow also makes it possible to increase the amplitude of the shear stresses (by opposing a mainly turbulent flow).

Finally, in a confined laminar flow, the shear stresses are not only localised at the level of the walls of the first section, and therefore being exerted on a larger carrier fluid fraction than what is observed for a turbulent flow. The laminar flow thus makes it possible to improve efficiency with respect to the methods known from the state of the art.

According to an embodiment, the first pipe section has a cross-section of elongated shape of aspect ratio greater than 3.

According to an advantageous embodiment, the pressure imposed on the carrier fluid flowing at a first flow rate in the first section is less than 30 bars, preferably less than 10 bars, for example between 5 and 9 bars, preferably between 6 and 8 bars.

According to an alternative embodiment, the first flow rate is suitable so that the flow of the carrier fluid loaded with particles in the first section is turbulent.

According to an implementation, the first flow rate is suitable so that the cavitation bubbles formed in the carrier fluid loaded with particles have a size less than 50 µm.

According to an implementation, the carrier fluid has a viscosity greater than or equal to 1 mPa·s, for example, the carrier fluid comprises at least one of the elements selected from among: water, butanol, isopropanol, N-Methyl-2 pyrrolidone (NMP), acetone, toluene.

Thus, the method according to the invention makes it possible to use carrier fluids having a higher viscosity, without necessarily resorting to more powerful pumping systems to impose a flow rate on said carrier fluid.

Moreover, the number of carrier fluids of which the viscosity is greater than 1 mPa·s can have a proven toxicity. Contrary to the methods known from the state of the art, the exfoliation method according to the present invention only requires very low quantities of carrier fluid, thus opening the path for using toxic carrier fluids.

According to an implementation, the particles comprise at least one of the elements selected from among: graphite, transition metal dichalcogenides.

According to an implementation, the first flow rate is greater than 1 litre per hour.

According to an implementation, the cross-section of the first pipe section is circular, rectangular, triangular, or trapezoidal.

According to an implementation, the first section has a length less than 5 mm.

According to an embodiment, the carrier fluid, prior to the flow thereof into the first section, is gassed.

Thus, the number of cavitation bubbles increases with respect to a non-gassed fluid.

The invention also relates to a method for exfoliating particles, the method comprises the flow, at a first flow rate, of a carrier fluid loaded with particles, in a first section, then in a second section of a pipe, the first section and the second section being contiguous, the first flow rate being suitable for generating shear stresses and cavitation bubbles in the carrier fluid loaded with particles as it passes through into the first section of the pipe, the second section of the pipe having a hydraulic diameter suitable for bringing about an implosion of cavitation bubbles as soon as the carrier fluid loaded with particles exits the first section is flows into the second section, so that an exfoliation of the particles is brought about under the combined action of the shear stresses and a shock wave generated by the implosion of the cavitation bubbles, the first section of the pipe has a hydraulic diameter less than 300 µm, preferably less than 150 µm, also more preferably less than 90 µm, and in that the first flow rate is suitable so that the flow of the carrier fluid loaded with particles in the second section is laminar.

The invention also relates to a device for exfoliating particles comprising a pipe, the pipe comprising a first section, and a second section connected sealed so that a fluid can flow from the first section to the second section, the first section having a first hydraulic diameter, and the second section having a second hydraulic diameter greater than the first hydraulic diameter, the first hydraulic diameter being less than 300 µm, preferably less than 150 µm, also more preferably less than 90 µm, and the first pipe section has a cross-section of elongated shape of aspect ratio greater than 3.

According to an embodiment, a pump or a compressed air system is connected to the device, said pump or said compressed air system being suitable for generating a flow of a fluid from the first section to the second section.

BRIEF DESCRIPTION OF THE DRAWINGS

Other characteristics and advantages will appear in the following description of the exfoliation method according to the invention, given as non-limiting examples, in reference to the appended drawings, wherein.

DETAILED DESCRIPTION OF SPECIFIC EMBODIMENTS

Figure 1:
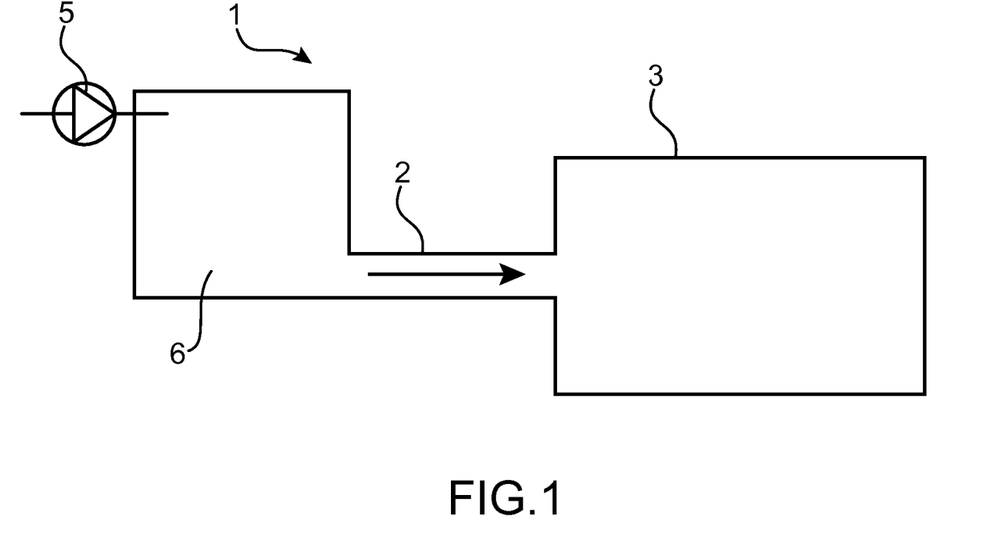
FIG. 1 is a schematic representation of a pipe 1 comprising a first section 2 and a second section 3 for the implementation of the method according to the invention.
Figure 2:
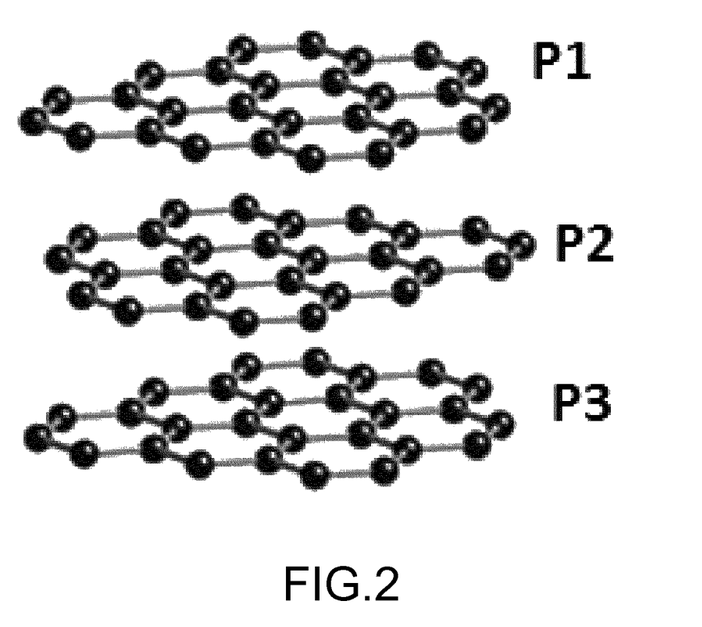
FIG. 2 is a representation of the arrangement of carbon planes (P1, P2 and P3) in the graphite.

In reference to FIGS. 1 and 2, a method for exfoliating particles will therefore be described according to a first embodiment.

A method for exfoliating particles according to the present invention comprises the provision of a carrier fluid loaded with particles.

The carrier fluid can have a solid volume fraction less than 5%. By sold volume fraction, this means the volume of the solid phase out of the total volume of the suspension.

The size of the particles can be between 0.1 µm and 50 µm, for example 5 µm.

The particles are suitable for being exfoliated during the implementation of the method according to the invention.

By particles suitable for being exfoliated, this means detaching, by sheets or by slides, the surface from said particles.

The exfoliation of the particles can be generated by applying an energy, greater than a predetermined energy, at the level of said particles.

Generally, the particles likely to be exfoliated can comprise a lamellar crystallographic structure, more specifically, said particles can comprise the stack of sheets constituted of monoatomic planes. In this regard, particles comprising a lamellar crystallographic structure will be exfoliated along a direction parallel to said monoatomic planes.

In the case of particles comprising a lamellar structure, the predetermined energy corresponds to the binding energy between the sheets. More specifically, the order of magnitude of the binding energy between two graphite planes is 10 kJ/mol (this energy can also be expressed by an atom: 120 meV/atom).

In this regard, the particles can comprise at least one element selected from among: graphite, transition metal dichalcogenides.

The method according to the invention is however not limited to the particles having a lamellar crystallographic structure.

The carrier fluid can comprise water. However, it will be seen, below in the description of the invention, that it is possible to use other types of carrier fluids.

The exfoliation method according to the invention comprises the flow of the carrier fluid loaded with particles to be exfoliated in a pipe 1. The carrier fluid flows into the pipe 1 in the course and the direction indicated by the arrow represented in FIG. 1.

The pipe 1 comprises at least one first section 2 and a second section 3.

The first section 2 can have a cross-section of circular or rectangular or triangular, or trapezoidal shape, without however being limited to the shapes cited.

The first section 2 can have a cross-section of elongated shape (by elongated shape, this means a long, slender shape). The elongated shape of the cross-section can be defined by the aspect ratio thereof. Thus, the cross-section can have an elongated shape with an aspect ratio greater than 3. According to such an aspect ratio, it is possible to obtain a confinement along one single dimension, and consequently to produce a large number of first sections on one same device or on one same chip.

The second section 3 can have a cross-section of circular or rectangular, or triangular, or trapezoidal shape, without however being limited to the shapes cited.

The first section 2 and the second section 3 are contiguous and linked sealed so that the carrier fluid loaded with particles flows from the first section 2 to the second section 3.

Before being injected into the first section 2 of the pipe 1, the carrier fluid loaded with particles can be found in a reservoir 6 connected to said first section 2.

The flow of the carrier fluid loaded with particles is executed at a first flow rate. The first flow rate can, for example, be imposed by a pumping system 5 (or a pump) or a compressed air system. The pumping system or said compressed air system can be connected to the reservoir 6 so as to push the carrier fluid loaded with particles in the first section 2.

Also, according to the invention, the first flow rate and the hydraulic diameter of the first section 2 are suitable so that the shear stresses and the cavitation are generated at the level of the carrier fluid as it passes through into said first section 2.

Figure 3:
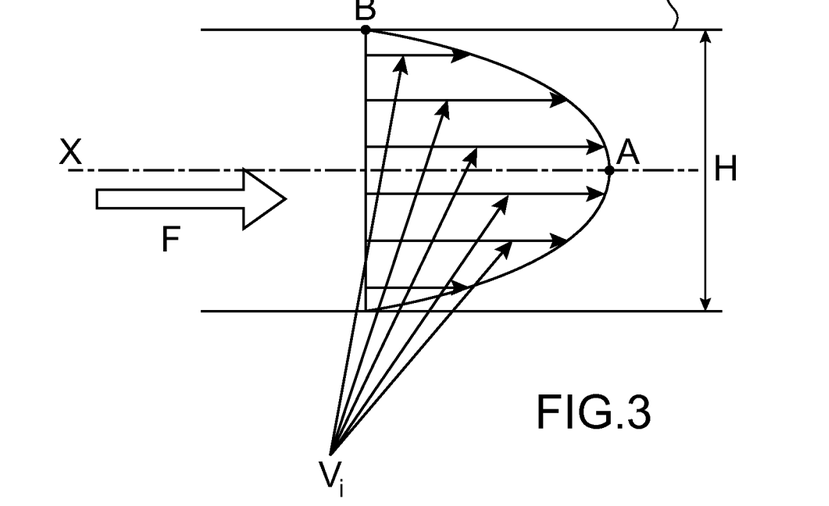
FIG. 3 is an illustration of shear stresses present during a flow of a fluid in a pipe, the course and the direction of the flow are symbolised by the arrow F, the distribution of flow speeds of the fluid in the pipe is illustrated by the arrows $V_i$.

In this regard, such as represented in FIG. 3, the appearance of shear stresses in the scope of a flow called "laminar flow" will be described. It is understood that the shear stresses also appear in a turbulent flow (by turbulent flow, this means a flow which is not laminar). In reference to FIG. 3, as soon as a carrier fluid flows, along the course and the direction of the arrow F, in a pipe 4 extending along an axis XX', a spatial variation of the speed of said carrier fluid can be observed (the distribution of the flow speeds of the carrier fluid in the pipe 4 is illustrated in FIG. 3 by the arrows $V_t$). Thus, the flow of a carrier fluid in a pipe 4, for example of tubular shape, will have a greater flow speed at the centre of the pipe 4 (position A) than at the level of the wall of said pipe 4 (position B). It is said that a shearing is produced. More specifically, the speed of the carrier fluid at the centre of the pipe 4 is maximal, while it is zero at the level of the walls of said pipe 4. Thus, as soon as the carrier fluid is loaded with particles, the shear stresses generated during the flow of the carrier fluid are exerted on the particles. The amplitude of the shear stresses depends on the viscosity of the carrier fluid, on the flow rate thereof, on the passage section (the passage section being the cross-section of the pipe 4), and on the height characteristic of the flow (height H represented in FIG. 3).

Moreover, the hydraulic diameter of the second section 3 of the pipe 1 is suitable for bringing about the implosion of the cavitation bubbles formed in the fluid as is passes through into the first section 2 of the pipe 1. In other words, as soon as the cavitation bubbles formed in the first section 2 of the pipe 1 enter into the second section 3 of the pipe 1, a sudden increase of pressure is produced (because of the slowing of the flow of the carrier fluid at the level of the second section 3), and thus brings about the implosion of said cavitation bubbles. This implosion is accompanied by a shock wave which is propagated in the pipe, and more specifically in the second section 3. The hydraulic diameter of the second section 3 can be greater than the hydraulic diameter of the first section 2.

By hydraulic diameter, this means four times the area of the cross-section of a pipe 1 divided by the perimeter wettened by the fluid of said cross-section. The cross-section of a pipe 1 is defined by the intersection of a plane with said pipe 1, the plane being arranged along a direction perpendicular to the flow of a fluid in said pipe 1 (or the axis of elongation of the pipe). Thus, the hydraulic diameter of a circular-section tube corresponds to the diameter of said circular section.

During the flow of the fluid loaded with particles, the tangential stresses (the tangential stresses being defined by the product of the viscosity of the carrier fluid by the shearing rate) generated in the first section 2 of the pipe 1 being exerted on said particles, so that an exfoliation of the particles can be observed (the intensity of the tangential stresses can reach 1000 N·m$^{-2}$). It is noted, that the amplitude of the shear stresses being exerted on the particles is a function of the speed gradient of the carrier fluid flowing along a direction perpendicular to the flow thereof (in other words, perpendicularly to the arrow represented in FIG. 1).

Thus, for a shearing greater than $10^{+5}$ s$^{-1}$, it is possible to exfoliate graphite particles, and thus to form graphene particles of a thickness less than 20 nm, advantageously the graphene particles obtained by the method according to the invention are sheets of monoatomic thickness.

The implosion of the cavitation bubbles, in the second section 3 of the pipe 1, generates an additional stress which is exerted on the particles. Indeed, the implosion of the cavitation bubbles brings about a shock wave, which is propagated in the pipe 1, and which increases the exfoliation of the particles initiated by the shear stresses in the first section 2 of the pipe 1. Thus, at the time of the passing through thereof of the pipe 1, the particles are thus subjected to the combination of stresses due to the shearing and the stresses generated by the shock wave.

Moreover, the first section 2, because of the low hydraulic diameter thereof, represents a confined volume, with respect to what is known from the state of the art. This confinement thus imposes a greater number of cavitation bubbles, and of a smaller size with respect to the state of the art. Thus, the implosion of each cavitation bubble creates, because of the small size of said bubble, a shock wave of lesser intensity with respect to the state of the art. Consequently, said shock wave makes it possible to assist the exfoliation due to shearing, without breaking the exfoliated planes (the graphene planes, for example). It is thus possible to obtain exfoliated particles of a greater size than those obtained by the methods known from the state of the art (by greater size, this means a greater extent along the exfoliation plane). The quality of the exfoliated particles are found to be improved.

The implosion of the cavitation bubbles thus makes it possible to improve the efficiency of the exfoliation method. The efficiency of the exfoliation method is associated with the quantity of exfoliated particles (for example, graphene) according to the quantity of particles (for example, graphite) on which the method is applied.

By quantity of particles, this means a mass.

According to the invention, the hydraulic diameter of the first section 2 is less than 300 µm, preferably less than 150 µm, also more preferably less than 90 µm.

For example, the first section 2 of the pipe 1 can be a tube of which the diameter is equal to 80 µm. According to another example, the first section 2 can have a rectangular cross-section of 100 µm in height, and of 80 µm in width (the hydraulic diameter is, in this case, equal to 89 µm). According to an additional example, the first section 2 can have a trapezoidal section, of large base of 1000 µm, of small base of 790 µm, and of sides of 64 µm (which corresponds to a hydraulic diameter of 108 µm, and an aspect ratio of 19).

For such a hydraulic diameter of the first section 2 of the pipe 1, the pressure to be applied to the carrier fluid, to generate shear stresses and the cavitation in said first section 2, can be less than 30 bars, preferably less than 10 bars, for example between 5 and 9 bars, preferably between 6 and 8 bars. Thus, for such pressures, it is not necessary to implement complicated pumping systems, and systems for which maintenance is expensive.

For example, a pump with a power less than 5 kW, and making it possible to impose a pressure less than 35 bars, can make it possible to implement the exfoliation method according to the invention.

Moreover, a hydraulic diameter of the first section 2 less than 300 µm, preferably less than 150 µm makes the combined effects of the shear stresses and of the shock wave associated with the implosion of cavitation bubbles more effective than the methods known from the state of the art.

Indeed, the first section 2 of the pipe 1 constitutes a more confined environment than that described in document CN 102249222. Moreover, contrary to the present invention, the device described in document CN 102249222 does not make it possible to achieve a laminar flow.

Particularly advantageously, the carrier fluid has a viscosity greater than 1 mPa·s, for example, the carrier fluid comprises at least one of the elements selected from among: water, a mixture of water and isopropanol.

Moreover, given the low quantity of carrier fluid for the implementation of the method according to the invention, toxic carrier fluids can be used, like for example: toluene, acetone, N-Methyl-2-pyrolidone (NMP).

Particularly advantageously, the flow of the carrier fluid in the first section 2 can be laminar. By laminar flow, this means a flow where the fluid layers "slide" against each other, the speed of each one decreasing from the centre of the conduit to the walls, without there being a mixture of material between the layers. Thus, the implementation of a laminar flow conjugated at a very high shearing rate makes it possible to significantly increase the shear stresses and consequently to improve the efficiency of the method. This set of conditions, in a first section 2 having a hydraulic diameter less than 90 µm, can be implemented by imposing, with a pumping system, a pressure typically between 5 and 15 bars according to the viscosity of the fluid in question.

The invention also relates to a second embodiment which mainly continues the characteristics of the first embodiment described above. In this second embodiment, the flow in the second section is laminar, but it is not necessarily in the first section.

The method according to the invention makes it possible to consider the integration of pipes 1 on chips. The device for the implementation of the exfoliation method according to the invention requires little space. Said device can, moreover, be produced by micro-production techniques well-known to a person skilled in the art, and very common in white rooms intended for the production of microelectronic devices or MEMS. The on-chip controlling of the temperature of the pipe 1 makes it possible to easily increase the value of the saturating pressure of the carrier fluid, i.e. the intensity of the cavitation. This results in an increase in the delamination efficiency, with a device that requires little space, that can be integrated into a production chain or into a white room. Micro-production techniques make it possible to consider a production of microreactors (a plurality of pipes 1) arranged parallel, the assembly being able to process a consequent quantity of carrier fluid.

The increase of the efficiency will also make it possible to process less carrier fluid, and for example, to work with suspensions dispersed in a liquid more viscous than water to increase the tangential stress subjected to by particles.

Figure 4:
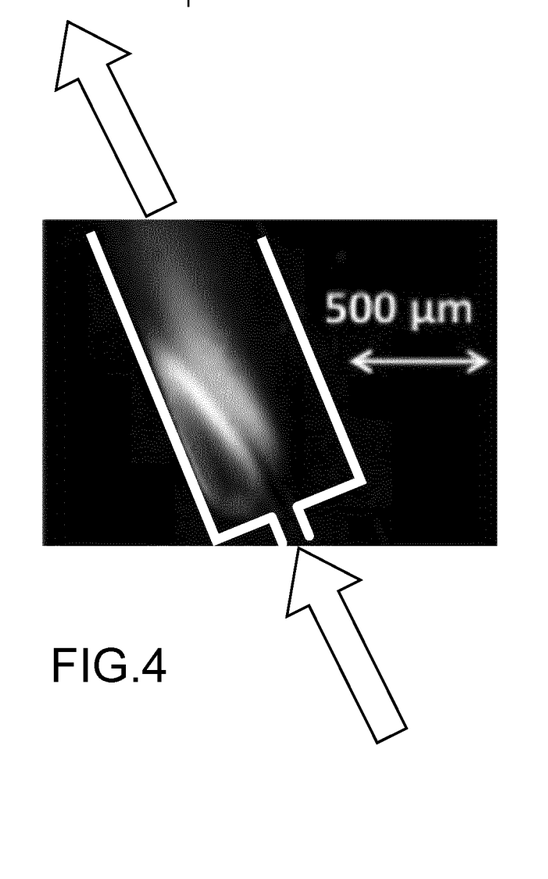
FIG. 4 is an implementation example of the exfoliation method according to the invention.

An implementation example of the invention is given in FIG. 4. The pipe is formed on a silicon substrate by engraving techniques.

The first section 2 is of a width of 50 µm and of a depth of 150 µm (which corresponds to a hydraulic diameter of 75 µm).

The second section 3 is of a width of 500 µm and of a height of 150 µm.

The carrier fluid comprises water.

A pump or a compressed air system is used to generate a flow rate of carrier fluid of 1 litre per hour.

The implementation of the method according to the example of FIG. 4 makes it possible to achieve an efficiency of a few percent.

The present invention has been implemented for the exfoliation of graphite particles of nominal dimension of 20 µm in an aqueous solution.

The concentration of particles was 10 mg/ml.

The aqueous solution also comprised sodium cholate as a surfactant at a concentration of 0.2 mg/ml.

The solution has subsequently been processed by a device that conforms with what has been able to be described above.

In this specific example, the first section 2 and the second section 3 had, respectively, a hydraulic diameter of 230 µm and of 540 µm.

The pressure imposed on the carrier fluid flowing at the first flow rate in the first section was 4 bars.

After 174 hours of processing, considering that 6 minutes of processing correspond to one cycle, the solution has been centrifugated so as to separate the exfoliated particles from the carrier fluid.

Figure 5A:
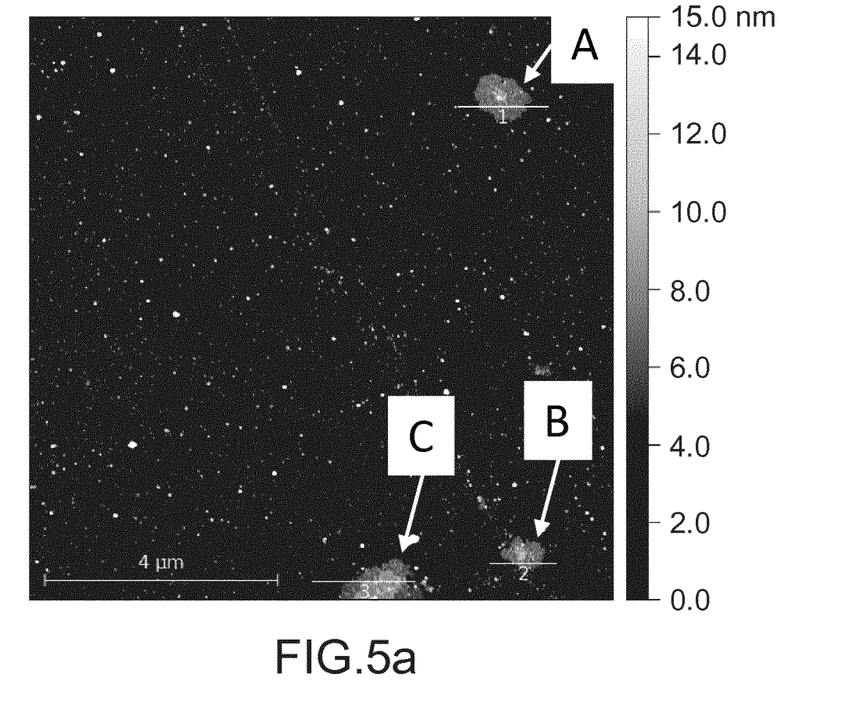
FIG. 5a is an image of exfoliated particles, according to the exfoliation method of the present invention (positions A, B and C), the image being obtained by atomic force microscopy (AFM), while the graph 5b represents the profile of the particles, in particular the vertical axis represents the thickness in nm, and the horizontal axis represents the extent of the particles in µm.
Figure 5B:
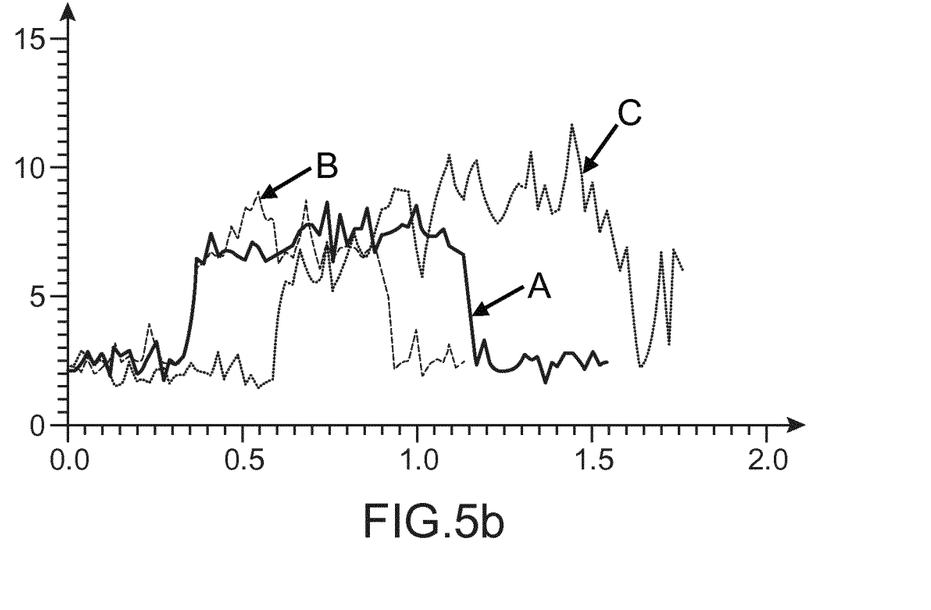

FIG. 5a is an image of exfoliated particles (positions A, B and C) obtained by atomic force microscopy (AFM), while the graph 5b represents a profile of said particles. The exfoliated particles A, B and C have a thickness less than 10 nm, and an extent of between 500 nm and 1 µm.

Figure 6A:
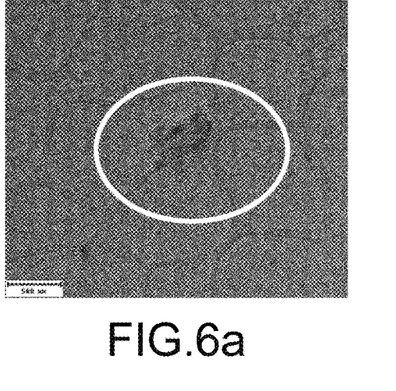
FIGS. 6a to 6c are images of exfoliated particles according to the exfoliation method of the present invention, the images being obtained by transmission electron microscopy (TEM)
Figure 6B:
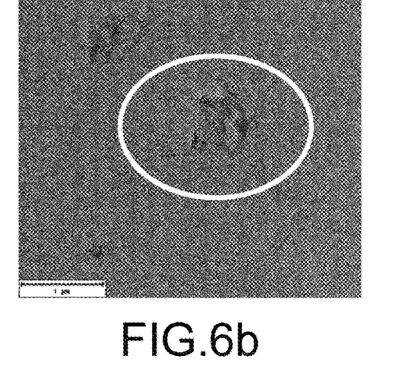
Figure 6C:
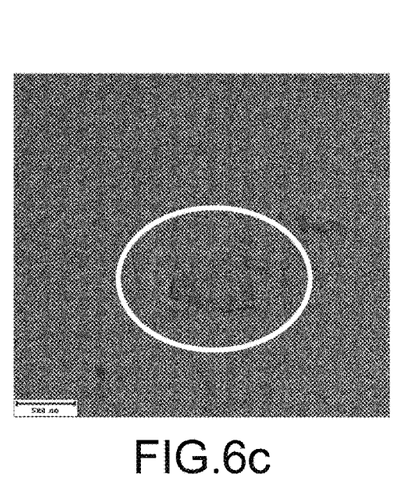

FIGS. 6a to 6c are images, obtained by transmission electron microscopy (TEM), of exfoliated particles. The images obtained by this technique make it possible to perform a statistical analysis of the exfoliated particles, and in particular, to establish a distribution according to the size (the extent thereof) of said particles.

Figure 7:
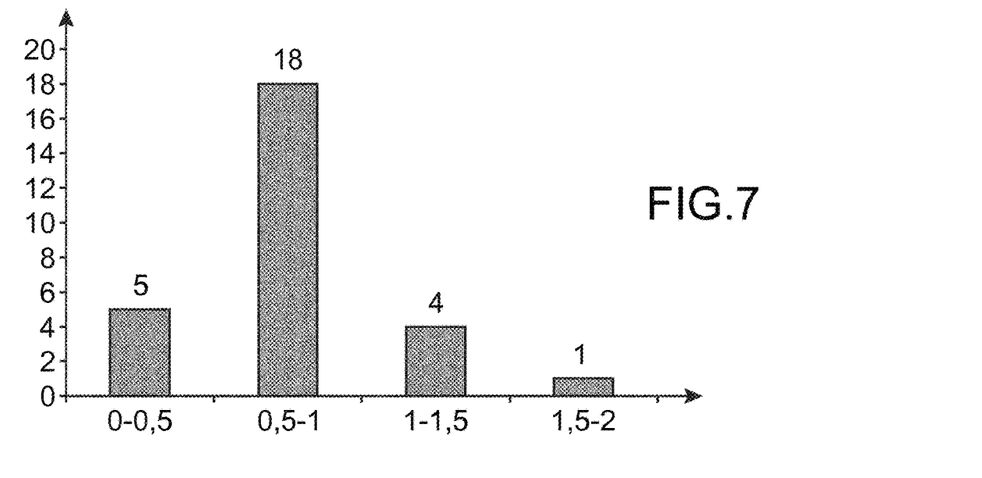
FIG. 7 is a graphic representation of the number of particles, exfoliated according to the exfoliation method, (along the vertical axis) according to the size thereof (along the horizontal axis in micrometres).

Thus, FIG. 7 is a graphic representation of the number of particles (along the vertical axis) according to the size thereof (along the horizontal axis in µm).

It is very clearly observed on this graph, that the particles having a size of between 0.5 µm and 1 µm are mainly present.

The results from experiments thus obtained make it possible to conclude on the effectiveness of the exfoliation method according to the present invention, and in particular on the possibility of obtaining the exfoliated particles according to a homogenous size distribution.

The invention also relates to a device for exfoliating particles comprising a pipe 1, the pipe 1 comprises a first section 2, and a second section 3 bound sealed so that a fluid can flow from the first section 2 to the second section 3, the first section 2 having a first hydraulic diameter, and the second section 3 having a second hydraulic diameter greater than the first hydraulic diameter, the first hydraulic diameter being less than 150 µm, preferably less than 90 µm, also more preferably less than 80 µm.

Such a pipe 1 can be obtained, among other ways, by micro-production techniques comprising:

the provision of a silicon substrate (for example, a nitrided silicon substrate, i.e.: comprising a silicon nitride layer on the surface thereof), or a silicon on insulator substrate (said substrate comprising a silicon layer of 150 µm (or 300 µm) thick), the definition of a pattern representing the pipe 1 by photolithographic techniques, the dry (by plasma) or liquid (with KOH or TMAH) engraving of the pattern defined during the photolithographic step, so as to create a cavity in the silicon layer, said cavity being intended to form the pipe 1, the binding by anodic sealing of a borosilicate substrate (for example, a PYREX substrate known under the reference, Corning 7740 of the company Corning, the PYREX substrate can be bored beforehand to ensure the flow of the carrier fluid) on the silicon layer so as to close the cavity, and form the pipe 1.

A pump 5 can be connected to the pipe 1, said pump 5 being suitable for generating a flow of a fluid from the first section 2 to the second section 3.

The invention claimed is:

1. A device for exfoliating particles, comprising:
a pipe, the pipe comprising a first section, and a second section bound sealed to allow a fluid to flow from the first section to the second section,
the first section has a first cross-section, and the second section has a second cross-section greater than the first cross-section, the first cross-section having a ratio 4A/P less than 300 µm, A being an area of the first cross-section and P being a perimeter of the first cross section, and
the first cross-section has an elongated shape having an aspect ratio greater than 3.

2. The device according to claim 1, wherein a pump is connected to the device, said pump being configured to generate a flow of the fluid from the first section to the second section.

3. The device according to claim 1, wherein the first cross-section has the ratio 4A/P less than 150 µm.

4. The device according to claim 1, wherein the first section cross-section has the ratio 4A/P less than 90 µm.

5. A method for exfoliating particles, the method comprises a flow, at a first flow rate, of a carrier fluid loaded with particles, in a first section, then in a second section of a pipe, the first section and the second section being contiguous, the first flow rate being suitable for generating shear stresses and cavitation bubbles in the carrier fluid loaded with particles as it passes through into the first section of the pipe, the second section of the pipe having a hydraulic diameter suitable for bringing about an implosion of the cavitation bubbles as soon as the carrier fluid loaded with particles exits the first section and flows into the second section, so that an exfoliation of the particles is brought about under the combined action of the shear stresses and a shock wave generated by the implosion of the cavitation bubbles,
wherein the first section of the pipe has a hydraulic diameter less than 300 µm, and the first flow rate is suitable so that the flow of the carrier fluid loaded with particles in the first section is laminar.

6. The method according to claim 5, wherein the first pipe section has a cross-section with an elongated shape having an aspect ratio greater than 3.

7. The method according to claim 5, wherein the first flow rate is suitable so that the cavitation bubbles formed in the carrier fluid loaded with the particles have a size less than 50 µm.

8. The method according to claim 5, wherein the particles comprise at least one of the elements selected from among: graphite, transition metal dichalcogenides.

9. The method according to claim 5, wherein the first flow rate is greater than 1 litre per hour.

10. The method according to claim 5, wherein the cross-section of the first section of pipe is circular or rectangular, or triangular, or trapezoidal.

11. The method according to claim 5, wherein the first section has a length less than 5 mm.

12. The method according to claim 5, wherein the first section of the pipe has a hydraulic diameter less than 150 µm.

13. The method according to claim 5, wherein the first section of the pipe has a hydraulic diameter less than 90 µm.

14. The method according to claim 5, wherein the carrier fluid has a viscosity greater than 1-mPa·s.

15. The method according to claim 14, wherein the carrier fluid comprises at least one of the elements selected from among: water, a mixture of water and isopropanol, N-Methyl-2-pyrolidone(NMP), acetone, or toluene.

16. The method according to claim 5, wherein a pressure imposed on the carrier fluid flowing at the first flow rate in the first section is less than 30 bar.

17. The method according to claim 16, wherein the pressure imposed on the carrier fluid flowing at the first flow rate in the first section is less than 10 bar.

* * * * *